J. AITKEN.
VEHICLE WHEEL.
APPLICATION FILED AUG. 16, 1915.
1,166,961.
Patented Jan. 4, 1916.
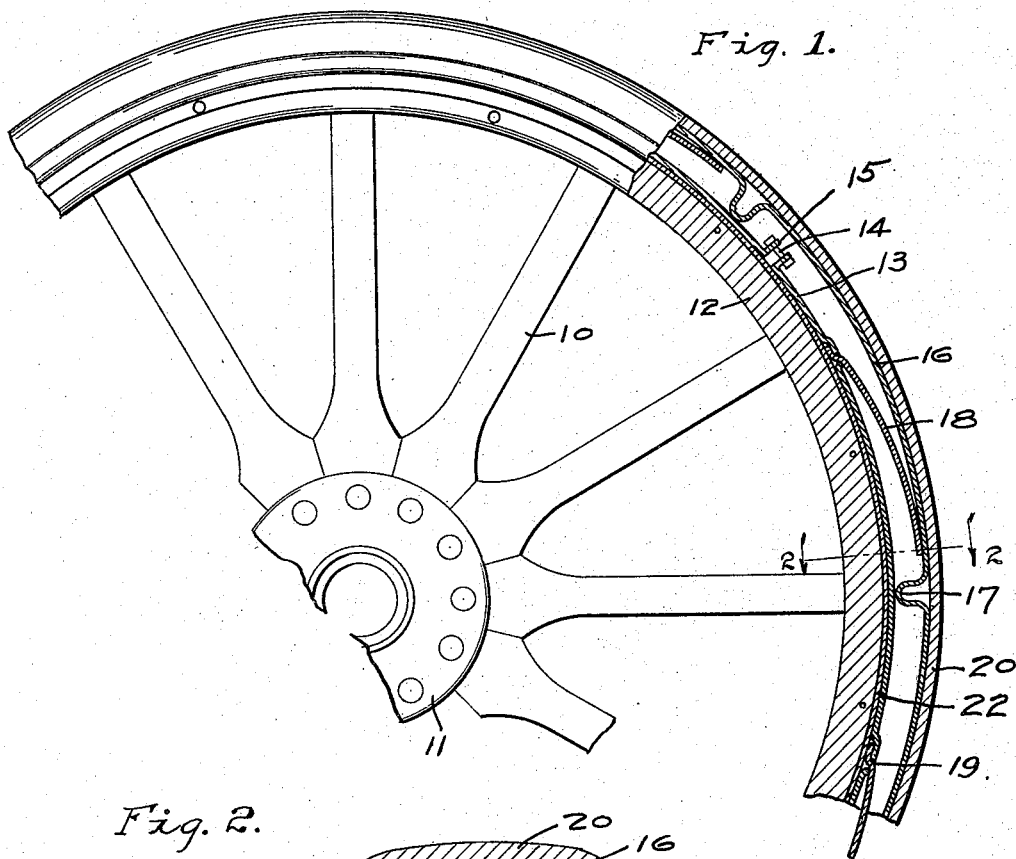
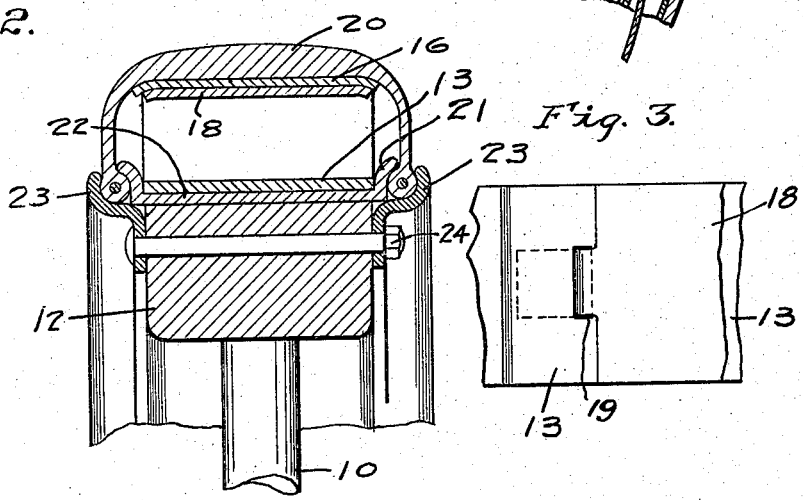
WITNESSES:
J H Swan
J. H. Wells
INVENTOR
James Aitken
BY
H. Lockwood
ATTORNEY

UNITED STATES PATENT OFFICE.

JAMES AITKEN, OF INDIANAPOLIS, INDIANA, ASSIGNOR OF ONE-HALF TO ROBERT STEVEN, OF INDIANAPOLIS, INDIANA.

VEHICLE-WHEEL.

1,166,961.   Specification of Letters Patent.   Patented Jan. 4, 1916.

Application filed August 16, 1915. Serial No. 45,725.

*To all whom it may concern:*

Be it known that I, JAMES AITKEN, a citizen of the United States, and a resident of Indianapolis, county of Marion, and State of Indiana, have invented a certain new and useful Vehicle-Wheel; and I do hereby declare that the following is a full, clear, and exact description thereof, reference being had to the accompanying drawings, in which like letters refer to like parts.

This invention relates to improvements in spring tires so as to provide for automobiles and other vehicles a tire having a permanent resiliency equal to that of the pneumatic tire, without the inconvenience of deflation.

This device is so constructed that it provides a suitable flexible construction less liable to internally injure the casing than others. There are springs secured to the rim band which are adapted to slidably engage a spring band on the innerside of the rubber casing, or other material, which does away with the necessity of a pneumatic inner tube and the construction of it provides a resilient spring tire of a cheap and practical construction.

Another object of this invention is to provide means for preventing the lateral displacement of the tire by means of inwardly curved portions of the spring band being held between the out-turned flanges of the tire rim.

Another feature of the invention is the insertion of the inner end of the springs within a slot in the removable rim band, so that the springs are held securely without bolts or other protruding means passing through them.

The full nature of the invention will be understood from the accompanying drawings and the following description and claims.

In the drawings, Figure 1 is an elevation of a portion of the vehicle wheel with parts broken away showing the spring construction in section. Fig. 2 is a cross section on the line 2—2 of Fig. 1. Fig. 3 shows the means for connecting the springs to the rim band.

There is a wheel 10 having a hub 11 and a felly 12. Secured around the felly there is a removable rim band 13 adapted to be drawn together by a bolt 14 extending through the ears 15 on the ends of said band so that it may be drawn securely about the felly. There is a spring band 16 surrounding said removable rim band and spaced a distance therefrom by means of inwardly curved portions 17 spaced at intervals around said spring and bearing on said rim band. Said inwardly turned portions 17 are adapted to rest between the out-turned flanges 21 of the tire rim 22 so as to hold said spring band from lateral displacement. Said spring band and inwardly curved portions thereof are so constructed as to yieldingly give when pressure is exerted thereon. There are spring members 18 having one end thereof reduced and bent so as to be inserted through a slot 19 in said rim band and firmly held under a raised portion thereof so as to lock one end of said spring securely on said rim band while the other end extends outwardly against the spring band 16 so as to resiliently hold it in its outward position. A hard rubber casing 20 is adapted to surround said spring band 16 and be gripped between the out-turned flanges 21 of the tire rim 22 and flange members 23 which are secured around the side of the wheel and held together by bolts 24.

The invention claimed is:

1. A vehicle wheel having a felly, a tire rim, a removable band secured on said tire rim, raised portions in said band, slots in said raised portions, an outer casing adapted to be secured to said tire rim, a spring member within said casing and surrounding said wheel, and springs between said band and spring member each having one end thereof inserted in one of said slots and the other end thereof resting against said spring member.

2. A vehicle wheel having a felly, a tire rim with out-turned flanges, an outer casing, means for securing said outer casing to said tire rim, a spring member within said outer casing having inwardly turned portions adapted to be held between said out-turned flanges, a removable band adapted to be secured around said tire rim and having slots therein, and springs having reduced and curved ends adapted to be inserted in said slots for securing said springs to said band without the use of bolts or other means passing through, the other ends of said springs being adapted to rest against said spring member.

In witness whereof, I have hereunto affixed my signature in the presence of the witnesses herein named.

JAMES AITKEN.

Witnesses:
J. H. WELLS,
R. G. LOCKWOOD.

Copies of this patent may be obtained for five cents each, by addressing the "Commissioner of Patents, Washington, D. C."